United States Patent Office 3,636,161
Patented Jan. 18, 1972

3,636,161
SYNTHESIS OF GEM-DIHALOCYCLOPROPANE
COMPOUNDS
Gene C. Robinson, Baton Rouge, La., assignor to Ethyl
Corporation, New York, N.Y.
No Drawing. Filed Nov. 26, 1969, Ser. No. 880,358
Int. Cl. C07c 43/32
U.S. Cl. 260—611 R
16 Claims

ABSTRACT OF THE DISCLOSURE

Hydrolysis of tris - (2,2-dihalocyclopropylcarbinyl)-orthoformate gives 2,2-dihalocyclopropyl carbinol. These orthoformates, which can be prepared by reacting triallylorthoformate with an alkali metal hydroxide and a haloform, and the carbinols resulting from the hydrolysis reaction are useful as germicides, insecticides, miticides and fungicides, and as chemical intermediates.

---

According to this invention 2,2-dihalocyclopropyl carbinol is prepared by hydrolyzing tris-(2,2-dihalocyclopropylcarbinyl)orthoformate. The orthoformate ester is in turn prepared by reacting triallylorthoformate with an alkali metal hydroxide and a haloform. In these reactions the halogen contained in the respective reactants is preferably chlorine, but it may be fluorine, bromine or iodine.

When preparing tris-(2,2-dihalocyclopropylcarbinyl)-orthoformate by reacting triallylorthoformate with an alkali metal hydroxide and a haloform, it is preferable that the haloform be chloroform (although bromoform, iodoform, chlorodifluoromethane, dichlorofluoromethane and the like are also suitable) and that the alkali metal hydroxide be sodium hydroxide (although lithium hydroxide, potassium hydroxide, rubidium hydroxide, and cesium hydroxide are also suitable). Although the reaction may be conducted in accordance with the procedures described in U.S. 3,265,743; 3,265,744; and 3,265,745, the disclosures of which are incorporated herein, it is especially desirable to cause reaction among triallylorthoformate, alkali metal hydroxide and haloform in an ether reaction medium. Thus use may be made of the ethers and reaction procedures described in U.S. 3,265,714, all disclosure of which is incorporated herein.

Particularly preferred ether reaction media are such glycol ethers as diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether and analogous substances.

Gem-dihalocyclopropanation of triallylorthoformate gives rise to the formation of new and useful compounds, viz tris-(2,2-dihalocyclopropylcarbinyl)orthoformates. Of these tris-(2,2-dichlorocyclopropylcarbinyl)orthoformate is preferred because of its ease of synthesis, excellent reactivity, and low cost. However the halo groups may be fluorine, bromine or iodine, if desired.

A preferred sequence of this invention is depicted by the following equations:

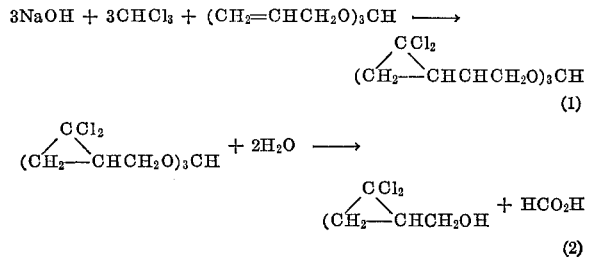

The dihalocyclopropylation reaction (Equation (1) above) may be conducted at a temperature in the range of from about −10 to about 100° C. Reaction (2) above, the hydrolysis, is generally performed at a temperature in the range of from about 0 to about 100° C. and for this purpose water and dilute aqueous acids will be found suitable. It is particularly convenient to conduct both steps in a glycol ether reaction medium.

The tris-(2,2-dihalocyclopropylcarbinyl)orthoformates provided by this invention are useful as germicides, insecticides, miticides and fungicides. When hydrolyzed pursuant to this invention these orthoformates are smoothly and efficiently converted into 2,2-dihalocyclopropyl carbinols, the latter being of use either directly as, or as intermediates in the synthesis of, germicides, fungicides, pesticides and miticides. In addition, the 2,2-dihalocyclopropyl carbinols may be reacted with such compounds as $PCl_3$, $POCl_3$ and $PSCl_3$ to product phosphite, phosphate, and thiophosphate esters which may have utility as flame proofing agents, lubricating oil additives, flotation agents, and the like.

The practice and advantages of this invention will become still further apparent from the following illustrative example.

EXAMPLE

A mixture of methyl orthoformate (8.9 g., 0.083 mole), allyl alcohol (20 g., 0.345 mole), and ammonium nitrate (0.30 g.) was stirred and heated under a distilling column until the distillate temperature reached 80° C. The residual material was distilled under reduced pressure yielding triallyl orthoformate (8.88 g., 57 percent, B.P. 101–110° C./34 mm.). The triallyl orthoformate (0.048 mole) was allowed to react with chloroform (20 ml., 0.25 mole) and sodium hydroxide pellets (40 g., 1.00 mole) in tetraethylene glycol dimethyl ether (25 ml.) in an ice bath with vigorous stirring during 1.5 hours whereby tris - (2,2-dichlorocyclopropylcarbinyl)orthoformate was formed. The mixture stood at 25° C. for 16 hours and was then diluted with water and extracted with ether. The ether extract was shaken twice with 20 percent aqueous hydrochloric acid. Examination of the ether phase (gas liquid phase chromatography) showed two products (area ratio 1:2). Removal of solvent gave 6.50 g., crude product having a carbonyl band in the infrared (formate ester contamination due to incomplete hydrolysis). Column chromatography on alumina decomposed the formate ester contaminant giving pure 1,1-dichloro-2-hydroxymethylcyclopropane (5.42 g., 27 percent on triallyl orthoformate): infrared 3.0 (bonded OH), 3.33, 3.42, 3.48, 6.85, 7.00, 7.20, 8.08, 8.22, 9.00, 9.60, 10.32, 10.70, 11.30, 12.40, and 13.40$\mu$; NMR 245 (OH) 218–230 (pair of doublets, —$CH_2O$), 65–135 p.p.m. (complex cyclopropyl H) and integrates for 3.1 protons —$CH_2OH$ and 3.0 protons on cyclopropane ring (calculated 3 protons and 3 protons). It forms a solid $\alpha$-naphthylurethane (M.P. 100–102° C.).

What is claimed is:

1. A process of preparing 2,2-dihalocyclopropyl carbinol which comprises hydrolyzing tris(2,2-dihalocyclopropylcarbinyl)orthoformate.

2. The process of claim 1 wherein the halo groups are chlorine.

3. A process of preparing 2,2-dihalocyclopropyl carbinol which comprises reacting triallylorthoformate with an alkali metal hydroxide and a haloform to produce tris-(2,2-dihalocyclopropylcarbinyl)orthoformate and then hydrolyzing the tris-(2,2-dihalocyclopropylcarbinyl)orthoformate.

4. The process of claim 3 wherein the haloform is chloroform.

5. The process of claim 3 wherein the alkali metal hydroxide is sodium hydroxide.

6. The process of claim 3 wherein the alkali metal hydroxide is sodium hydroxide and the haloform is chloroform.

7. The process of claim 3 performed in an ether reaction medium.

8. The process of claim 3 wherein the alkali metal hydroxide is sodium hydroxide, the haloform is chloroform, and the operations are conducted in a glycol ether reaction medium.

9. A process of preparing tris-(2,2-dihalocyclopropylcarbinyl)orthoformate which comprises reacting triallylorthoformate with an alkali metal hydroxide and a haloform.

10. The process of claim 9 wherein the haloform is chloroform.

11. The process of claim 9 wherein the alkali metal hydroxide is sodium hydroxide.

12. The process of claim 9 wherein the alkali metal hydroxide is sodium hydroxide and the haloform is chloroform.

13. The process of claim 9 performed in an ether reaction medium.

14. The process of claim 9 wherein the alkali metal hydroxide is sodium hydroxide, the haloform is chloroform, and the operation is conducted in a glycol ether reaction medium.

15. Tris-(2,2-dihalocyclopropylcarbinyl)orthoformate.

16. A compound of claim 15, viz, tris-(2,2-dichlorocyclopropylcarbinyl)orthoformate.

References Cited

UNITED STATES PATENTS

| 3,265,714 | 8/1966 | Robinson | 260—617 (R) X |
| 3,341,611 | 9/1967 | Popoff et al. | 260—617 (R) X |
| 3,376,349 | 4/1968 | Bruson et al. | 260—611 |

OTHER REFERENCES

Post, Chemistry of Aliphatic Ortho-Esters (1943), pp. 13 and 62.

BERNARD HELFIN, Primary Examiner

U.S. Cl. X.R.

260—617 R, 966, 967, 999; 252—8.1, 49.8, 60